Dec. 6, 1960
M. BOBO
2,963,307
HONEYCOMB SEAL
Filed Dec. 28, 1954
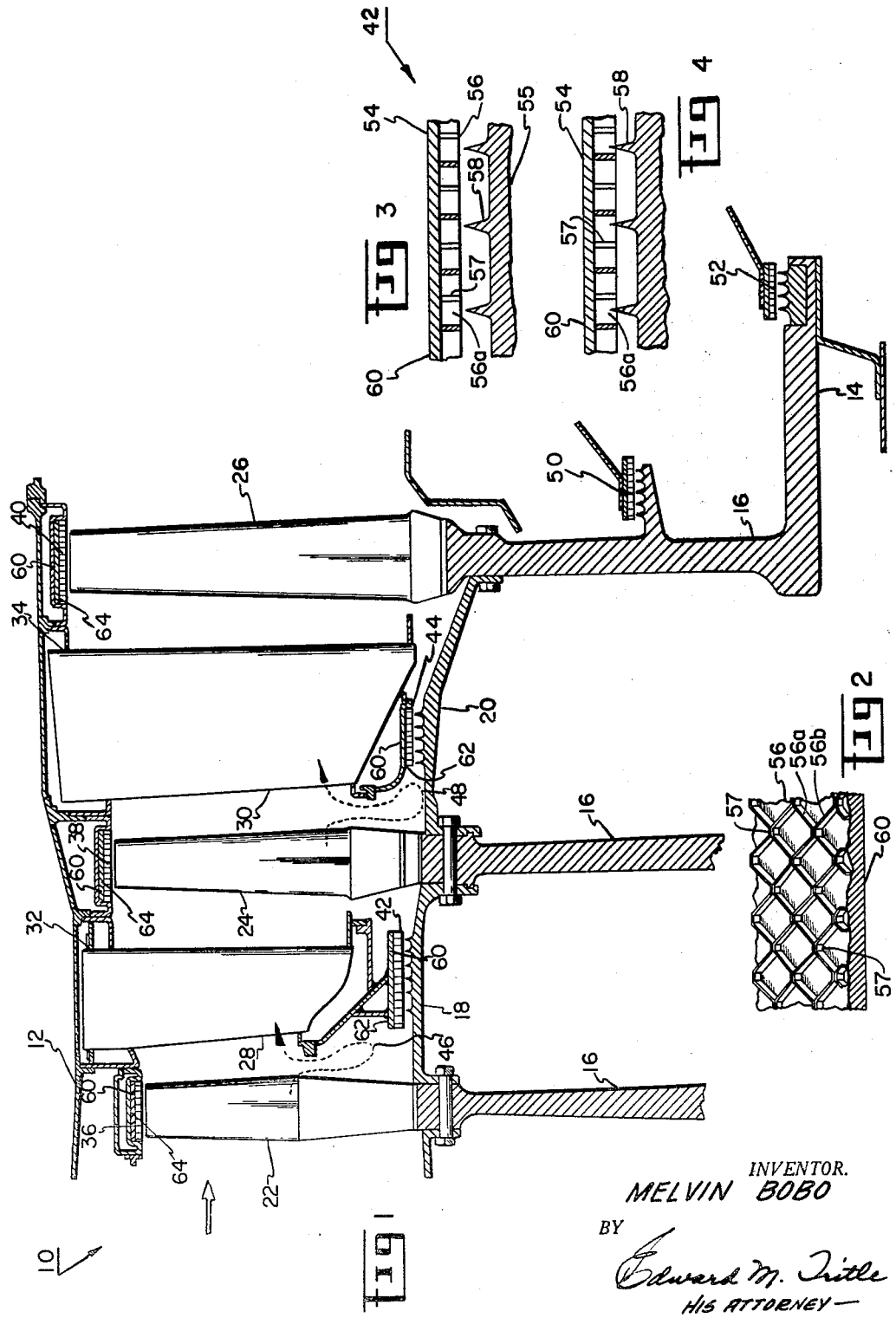
INVENTOR.
MELVIN BOBO
BY
Edward M. Title
HIS ATTORNEY—

United States Patent Office 2,963,307
Patented Dec. 6, 1960

2,963,307

HONEYCOMB SEAL

Melvin Bobo, Reading, Ohio, assignor to General Electric Company, a corporation of New York Filed Dec. 28, 1954, Ser. No. 478,009

2 Claims. (Cl. 286—10)

This invention relates to a seal and in particular to pressure seals for use in aircraft gas turbines.

In general, motive fluid is taken on board an engine and compressed by a compressor, and passes downstream to a combustion area where the motive fluid is burned by adding fuel to it thereby increasing its velocity and is forced out through a jet nozzle. As the motive fluid passes from the combustion chamber to the exhaust nozzle a portion of the energy is taken out of the motive fluid by a turbine which turbine is used for driving the compressor. In order to obtain the best efficiency for the engine it is desirable to direct as much of the hot gases as possible to pass between the turbine buckets. Therefore the stages of turbine buckets are positioned as close as possible to the casing, and the nozzle diaphragms as close as possible to the torque tubes, without creating rubbing, so as to obtain the maximum efficiency by keeping gas losses to a minimum. Pressure seals are placed between these parts to help reduce losses. Although this is desirable, it presents various problems with the operation of the engine. During high engine speeds, high turbine temperatures occur at the turbine. This necessarily results in large thermal differential expansion of the various parts. Therefore, frequently the parts expand to such an extent that rubbing occurs of the turbine buckets against the casing and the interstage seals at the nozzle diaphragms against the torque tubes which results in permanent damage to the engine. It is therefore a general object of this invention to permit the attainment of small clearance between the stationary and rotating members of a jet engine while still not subjecting the engine to damage due to rubbing and the like caused by high turbine temperatures.

In manufacturing the various parts for the jet engines, a build up of machining tolerances and a build up of eccentricities or any type of warpage can result in the parts contacting each other during operation. As a result, the rotating and the stationary portions of the engine may seize or become permanently damaged. It is therefore another object of this invention to permit manufacturing tolerances to be built up and permit eccentricities and warpage of the parts without affecting the operation of the engine.

Another further object of this invention is to provide a labyrinth type seal in which the stationary portions thereof are of cellular formation in which the labyrinths can cut into the cellular formation to provide running clearance without damage to the labyrinths or to the function of the seal.

It is a specific object of this invention to provide labyrinth seals at various positions of a gas turbine engine where rotation takes place between stationary and rotating parts, where some clearance is necessary to permit rotation but where minimum clearance is important to prevent gas losses, wherein the seals are made of cellular construction permitting the labyrinth of the stationary or rotating portion of the seal to cut into the cellular formation to obtain the necessary clearance at any time during operation of the engine without causing permanent damage.

It is another specific object of this invention to provide a stationary interstage seal between rotating turbine rotors, the seal being made of low mass cellular formation having low thermal capacity so as to permit rubbing of the interstage seals and the turbine rotors caused by high temperatures, thereby allowing the cellular material to burn away sufficiently to clear the rotating member before it is damaged.

These and other objects will become more apparent when read in the light of the accompanying drawing wherein; similar parts will have the same numbers and wherein;

Figure 1 is a cross-sectional view of the turbine showing a multistage turbine and nozzle diaphragms with seals positioned therebetween.

Figure 2 is a view showing the cellular honeycomb construction of the seal.

Figure 3 is a cross-sectional view of the labyrinth seal showing the labyrinths spaced from the honeycomb construction during normal operation.

Figure 4 is a cross-sectional view of the labyrinth seal showing the labyrinths penetrating into the cellular construction of the honeycomb seal during engine operation.

In order to provide maximum efficient operation of the aircraft gas turbine engine the turbine buckets of the turbine are positioned as close as possible to the turbine casing so as to prevent large tip losses and also the nozzle diaphragms are positioned as close as possible to the torque tubes connecting the stages of turbine while preventing large leakage losses. However, during certain operating conditions the temperatures are such that thermal differential expansions occur with the various parts, or the parts themselves may become slightly eccentric so as to cause rubbing. Therefore, in order to permit rubbing to occur between the moving and stationary parts without damage to the engine a cellular type constructed honeycomb seal is provided adjacent the tips of the buckets and at the interstage seals.

In referring to the drawings the numeral 10 generally designates a turbine having a casing 12 and turbine rotor 14. The turbine rotor 14 consists of a plurality of turbine wheels 16 fixed thereto by any conventional well-known method. The stages of turbine wheels are connected together by a plurality of torque tubes 18 and 20 so that the turbine rotates as a complete unit. Although three stages of turbine wheels are shown it is recognized that more or less stages can be used insofar as this invention is concerned.

Attached to the circumference or periphery of the turbine wheel 16 are a plurality of turbine buckets 22, 24 and 26. Positioned between the stages of turbine buckets and connected to the turbine casing are a plurality of nozzle diaphragms 28 and 30. It is noted that the nozzle diaphragms 28 and 30 are fixed to the turbine casing 12 at 32 and 34.

In order to make sure that the turbine buckets extend as far as possible across the gas stream so as to maintain the losses to the engine at a minium, tip seals 36, 38 and 40 are shown fixed to the turbine casing. Also in order to prevent motive fluid from leaking around the nozzle diaphragm, diaphragm seals 42 and 44 are provided. These seals force the major portion of the gases through the nozzle diaphragms and the turbine buckets so as to get the maximum benefit from the motive fluid as shown by the dotted lines at 46 and 48. In order to prevent the motive fluid from leaking from the desired path downstream of the turbine, seals 50 and 52 are provided as shown.

The seals 42, 44, 50 and 52 are constructed of stationary portions 54 and rotating portions 55. The stationary portion 54 is made of cellular construction as best shown in Figure 2 at 56 and is referred to as a honeycomb type cellular construction. The rotating portion 55 of the seal 42 is provided with a plurality of serrations 58 extending circumferentially about the torque tubes 18 and 20 and which are referred to as labyrinths. It is noted these labyrinths are used for the purpose of deflecting the flow therethrough so as to afford a restriction to the motive fluid so as to throttle it and thereby tending to choke it. It is noted that although the stationary portion is provided with a cellular construction 56 and the rotating portion with the labyrinths 58, it is intended that they can be reversed, the stationary portion having the labyrinths and the rotating portion having the cellular construction.

It is noted that the tip seals 36, 38 and 40 are of slightly different construction in that the stationary portion of the seals are formed of cellular construction and that the tips of the rotor blades take the place of the labyrinths and are adapted to cut into the seals to provide a groove for their own clearance without damage to the engine.

In order to make these seals, the honeycomb or cellular type construction is formed from thin sheet metal which may comprise a pair of corrugated strips 56a and 56b joined at 57 and brazed or welded to a cylindrical metal backing member or members 60 which is fixed to the stationary parts of the engine such as by welding or bolting or the like as shown at 62 of the nozzle diaphragm and 64 of the casing. It is noted that the cylindrical backing members can be made in segments or as a single unit. However for ease of assembly and so forth it is more desirable to make them in segments.

As the high temperature motive fluid passes downstream from the combustion chambers into the turbine area the motive fluid will pass between the nozzle diaphragms and the turbine buckets to permit the turbine bucket to take some energy out of the fluid. Since the more fluid that passes between the turbine buckets the greater the efficiency of the engine becomes, it is desirable to maintain a small clearance even though the temperatures become excessive at high speeds. The tip seals 36, 38 and 40 adjacent the turbine buckets permit smaller minimum gap clearances therebetween. In this manner more motive fluid can pass through the turbine buckets themselves. In the event that thermal expansions occur creating rubbing, the turbine buckets will cut a groove into the seal without any damage to the rotating parts or stationary parts. Also to direct the motive fluid through the nozzle diaphragms, seals 42 and 44 are provided so as to deflect the hot gases as shown at 46 and 48 back into the main stream of the hot gases. Likewise, whenever the temperatures create excessive amounts of thermal differential expansion of the interstage seals with respect to the torque tube, rubbing can be allowed in the engine by permitting the labyrinths 58 to cut into the cellular construction without damage to the parts as shown in Figure 5. It is to be noted from the drawings that the rotating labyrinth rubs 360° during rotation of the torque tube. Furthermore, each serration or tooth 58 contributes its entire thermal mass to the rotating component. Since the heat transfer capacity of such a tooth is small, due to its size and taper, it has relatively poor thermal conductivity and if conventional seal materials, e.g., silver solder were used it is quite likely that the tooth would melt before the seal. However, by using the honeycomb material shown in Fig. 2 in the seal and arranging it so that the partitions or walls 56a, 56b of the honeycomb cells are at a skewed angle relative to the plane of rotation of the contacting serrations, as shown in Figures 3 and 4, only a relatively small portion of the seal material is actually rubbed. In other words, the relative thermal mass presented by the honeycomb walls at the point of rubbing contact is always low compared to the thermal mass of the serration which contributes its entire mass. In short, even if the honeycomb material has a relatively high melting point it will burn away, i.e., plastically deform, before damage to the labyrinth. Further in order to obtain the maximum efficiency from the motive fluid cellular honeycomb seals are provided downstream from the turbine so as to direct the gases back into the main stream as shown by the seals at 50 and 52. Likewise, if the temperatures become excessive or the parts become warped due to the heat so that they become eccentric rubbing also will be allowed here without permanent damage to the engine by the labyrinths cutting into the cellular construction.

Although a metallic honeycomb type cellular construction has been shown and described, other types of cellular structures can be used; for example, any sponge type configuration metallic or non-metallic, as long as it has the characteristic of being capable of burning away or being cut so as to provide running clearances. Also the labyrinths or serrations may become worn down or it may be desirable to eliminate them entirely, but still the cellular construction would wear away in the event of rubbing without permanent damage to the engine. Further, high temperature melting metals can be used as the cellular construction, and in view of the low mass, it will heat up more rapidly than the high mass rotating labyrinths, thereby resulting in the burning away of the high temperature metal without damage to the engine.

By this arrangement thermal differential expansions to the rotating and stationary parts due to the high temperatures involved in the turbine area will not cause permanent damage to the engine in the event that rubbing occurs. Also, during these high temperatures the parts may become warped and become eccentric and again will not cause permanent damage to the engine since the rotating portions can cut their way into the stationary portions without damage thereto. In this manner smaller clearances can be maintained between the stationary and rotating parts thereby decreasing the losses of the hot gases from the engine thereby increasing the efficiency of the engine.

It is also noted that the honeycomb seal may be used at other portions of the engine where as small clearance as possible is desirable so as to decrease air losses; for example, in the compressor.

The specific embodiments described above have been given by way of illustration and not by way of limitation. Many modifications and improvements can be made to the above invention without departing therefrom, all of which are intended to be equivalents and be included within the spirit and scope of this invention.

What I claim as new and desire to secure by Letters Patent of the United States is:

1. A labyrinth type fluid seal for use between two members capable of relative rotational movement comprising: a generally cylindrical metal backing strip secured to one of the members; an annular section of lightweight open face cellular seal material affixed to the backing strip, the seal material comprising a plurality of cells having opposed walls, said cells extending toward the other member and closed at one end by the strip and open at the other end; a plurality of labyrinths projecting from said other member and adapted to cut into said cellular seal material in the event of rubbing contact therebetween, said cell walls being at a skewed angle with respect with the plane of rotation of each labyrinth so that the effective thermal mass of the seal material will be low relative to that of the labyrinth.

2. A labyrinth type fluid seal for use between two members capable of relative rotational movement comprising: a generally cylindrical metal backing strip secured to one of the members; an annular section of lightweight open face cellular seal material affixed to the backing strip, the seal material comprising a plurality of cells having opposed walls, said cells extending toward the other member and closed at one end by the strip and open at the other end; at least one knife-like serration projecting from said other member and in close relation to the cellular seal material, said serration being adapted to cut into said seal material in the event of rubbing contact therebetween, the cell walls being cut at a skewed angle by the contacting serration so that the effective thermal mass of the contacted portions of the seal material will be low relative to that of the serration to cause the seal material to plastically deform before damage to the serration can occur.

References Cited in the file of this patent

UNITED STATES PATENTS

| | | |
|---|---|---|
| 885,032 | De Ferranti | Apr. 21, 1908 |
| 899,319 | Parsons et al. | Sept. 22, 1908 |
| 941,395 | Westinghouse | Nov. 30, 1909 |
| 953,674 | Westinghouse | Mar. 29, 1910 |
| 1,357,739 | Steenstrup | Nov. 2, 1920 |
| 2,044,692 | Huhn | June 16, 1936 |
| 2,127,865 | Goddard | Aug. 23, 1938 |
| 2,573,425 | Fletcher | Oct. 30, 1951 |
| 2,742,224 | Burhans | Apr. 17, 1956 |

FOREIGN PATENTS

| | | |
|---|---|---|
| 407,012 | France | Dec. 20, 1909 |
| 716,553 | Germany | Jan. 23, 1942 |